(12) United States Patent
Stidd

(10) Patent No.: US 7,690,879 B2
(45) Date of Patent: Apr. 6, 2010

(54) SINGLE TOWING DEVICE FOR BOTH CAR AND CART

(76) Inventor: Robert Stidd, 194 Ponderosa Cir., Mooresville, NC (US) 28117

( * ) Notice: Subject to any disclaimer, the term of this patent is extended or adjusted under 35 U.S.C. 154(b) by 464 days.

(21) Appl. No.: 10/605,176

(22) Filed: Sep. 12, 2003

(65) Prior Publication Data
US 2005/0058529 A1 Mar. 17, 2005

(51) Int. Cl.
B60P 3/12 (2006.01)

(52) U.S. Cl. ............... 414/563; 414/462; 414/477; 414/480; 414/484; 280/33.991; 280/412; 280/476.1; 410/3; 410/19; 410/30

(58) Field of Classification Search ............ 414/462, 414/464, 469, 477, 480, 484, 563; 280/33.991, 280/412, 476.1; 410/3, 7, 9, 10, 11, 12, 19, 410/20, 23, 30
See application file for complete search history.

(56) References Cited
U.S. PATENT DOCUMENTS

| | | | | |
|---|---|---|---|---|
| 4,118,047 A | * | 10/1978 | Neasham | 280/402 |
| 4,578,014 A | * | 3/1986 | Colet | 414/483 |
| 4,750,856 A | * | 6/1988 | Lapiolahti | 414/563 |
| 4,986,559 A | * | 1/1991 | Yaklin | 280/402 |
| 5,468,115 A | * | 11/1995 | Alvis | 414/556 |
| 5,609,350 A | * | 3/1997 | Chumley et al. | 280/476.1 |
| 5,816,757 A | * | 10/1998 | Huston | 410/3 |
| 6,092,970 A | * | 7/2000 | Hahn et al. | 414/401 |
| 6,164,897 A | * | 12/2000 | Edwards | 414/537 |
| 6,336,783 B1 | * | 1/2002 | Young et al. | 414/563 |

* cited by examiner

Primary Examiner—Michael S Lowe
(74) Attorney, Agent, or Firm—Alfred M. Walker; John F. Vodopia

(57) ABSTRACT

The invention is a towing device which utilizes a towing base, wheels, and a plurality of movable tracks, a tongue hitch attachment, and a vehicle locator swivel plate. The invention can be supplied with hydraulic surge brakes or electric brakes as well as brake and turn lights. The invention can use tie down straps for securing the vehicle to the dolly. The invention features an adjustable car locator swivel plate which allows the adjustment of the weight distribution to fine tune the load by moving the weight.

5 Claims, 10 Drawing Sheets

SINGLE TOWING DEVICE FOR BOTH CAR AND CART

This invention relates generally to the art of towing devices and more particularly those which allows multiple a vehicles to be towed.

BACKGROUND

In today's world, there are a large number of people who are traveling in Recreation Vehicles (RV) which will be called motor homes in this application; this is especially true of older and retired members of society.

Many people who use motor homes park them at camps and camping sites, sometimes over night and sometimes for months at a time. Many of these camps are large with little means of transportation so many people bring and use golf carts or similar devices for transportation. This can also be true of a motorcycle, four wheeler or Jet Ski depending on the park and the type of usage desired.

For many motor home owners there is also a need for an alternative vehicle; as the motor home is not convenient for going to the store or for various day trips. When motor home is at a site it is usually connected to that site's water and power sources making it a burden to unhook. Therefore many motor home owners tow a car, truck or other vehicle behind the motor home as a means of transportation outside of the camping site.

Many motor home owners want both their car and their cart with them without having to use a full sized trailer or having someone else transport the golf cart for them.

Ideally, motor home can tow a golf cart or a similar device and a vehicle; however there is no device that can easily accommodate both. The lack of a device that can easily and safely handle both a cart and an automobile, shows that there is still room for improvement in the art.

SUMMARY OF INVENTION

The present invention relates to a towing device which utilizes a towing base, wheels, and a plurality of movable tracks, a tongue hitch attachment, and a vehicle locator swivel plate. The invention can be supplied with hydraulic surge brakes or electric brakes as well as brake and turn lights. Tie down straps are used for securing the vehicle to the dolly.

The invention features an adjustable car locator swivel plate. This allows the adjustment of the weight distribution to "fine tune" the load by moving the weight. The tongue weight can be adjusted to comply with the motor home hitch's requirements. Using the loading ramps supplied with the invention, the automobile and the golf cart can be ready for transport quickly and easily.

Accordingly, it is an object of the present invention to provide a towing device that allows for the easy and safe towing of a vehicle and a device like a golf cart, Jet Ski or motorcycle. It is another object of the present invention to provide a towing device that has moveable tracks so that it can be used to support and tow many different devices.

These, together with other objects of this invention, along with various features of novelty which characterize this invention, are pointed out with particularly in the claims annexed hereto and forming a part of this disclosure. For a better understanding of this invention, its operating advantages and the specific objects attained by its uses, reference should be had to the accompanying drawings and descriptive matter in which is illustrated in the preferred embodiment.

BRIEF DESCRIPTION OF DRAWINGS

Without restricting the full scope of this invention, the preferred form of this invention is illustrated in the following drawings.

DETAILED DESCRIPTION

The following description of a towing device is demonstrative in nature and is not intended to limit the scope of the invention or its application of uses.

The present invention relates to a towing device 1 which utilizes a towing base, wheels, and a plurality of movable tracks, a tongue hitch attachment, and a vehicle locator swivel plate. The invention can be supplied with hydraulic surge brakes or electric brakes as well as brake and turn lights. Tie down straps are used for securing the vehicle to the dolly.

Figure 1:
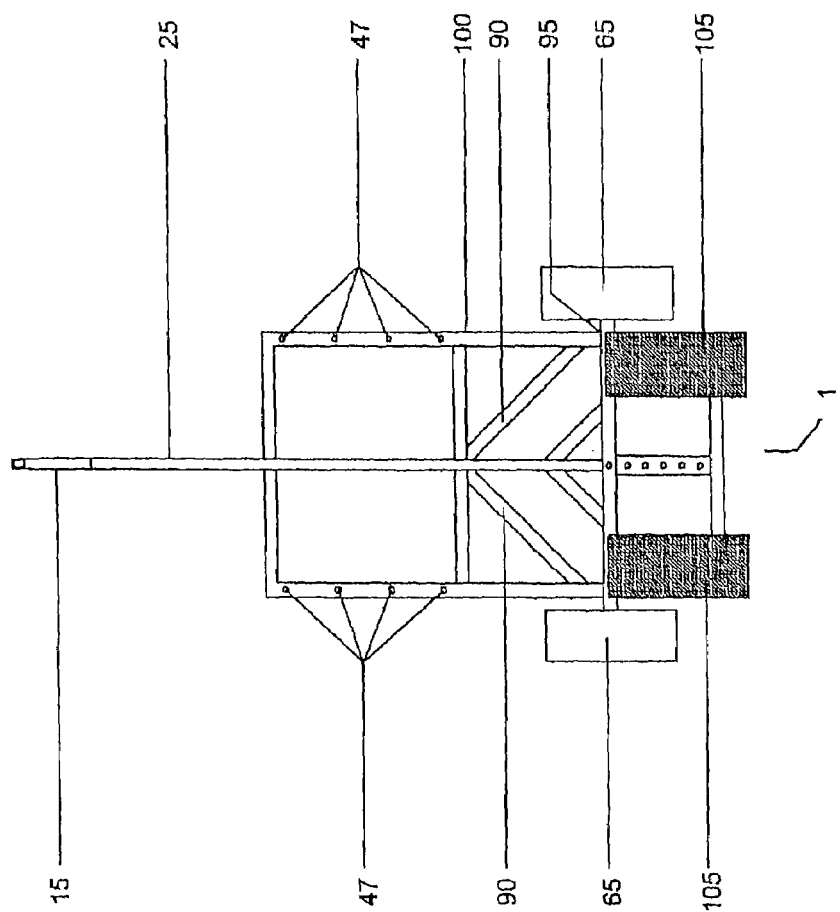
FIG. 1 shows a top front view of the main components of the device.
Figure 2:
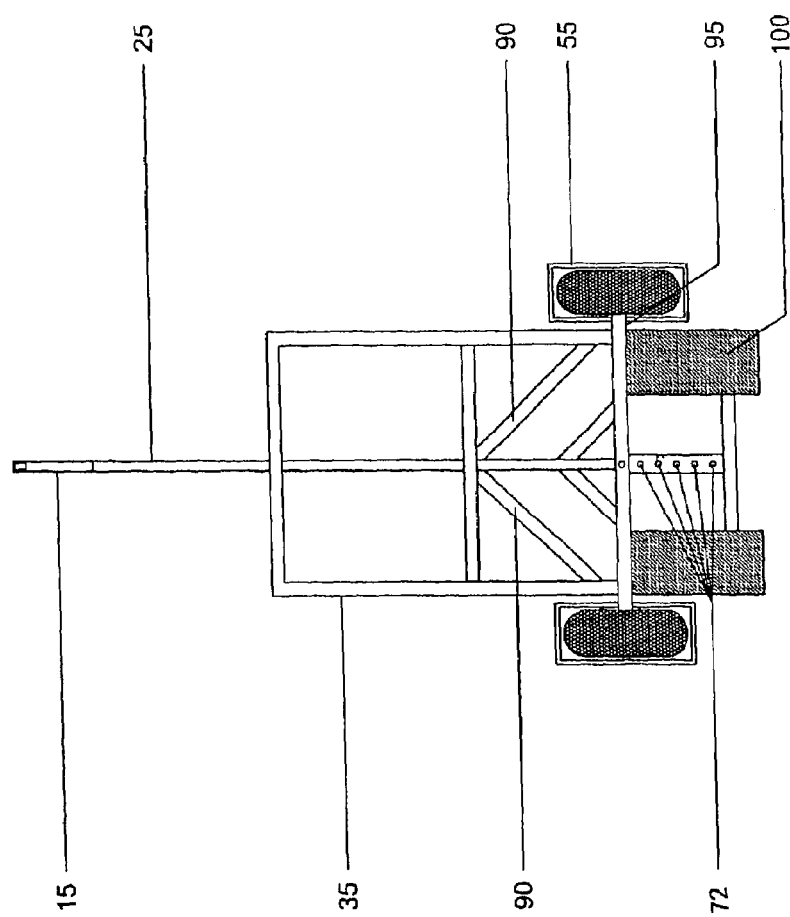
FIG. 2 displays a bottom side view of the main components of the device.
Figure 10:
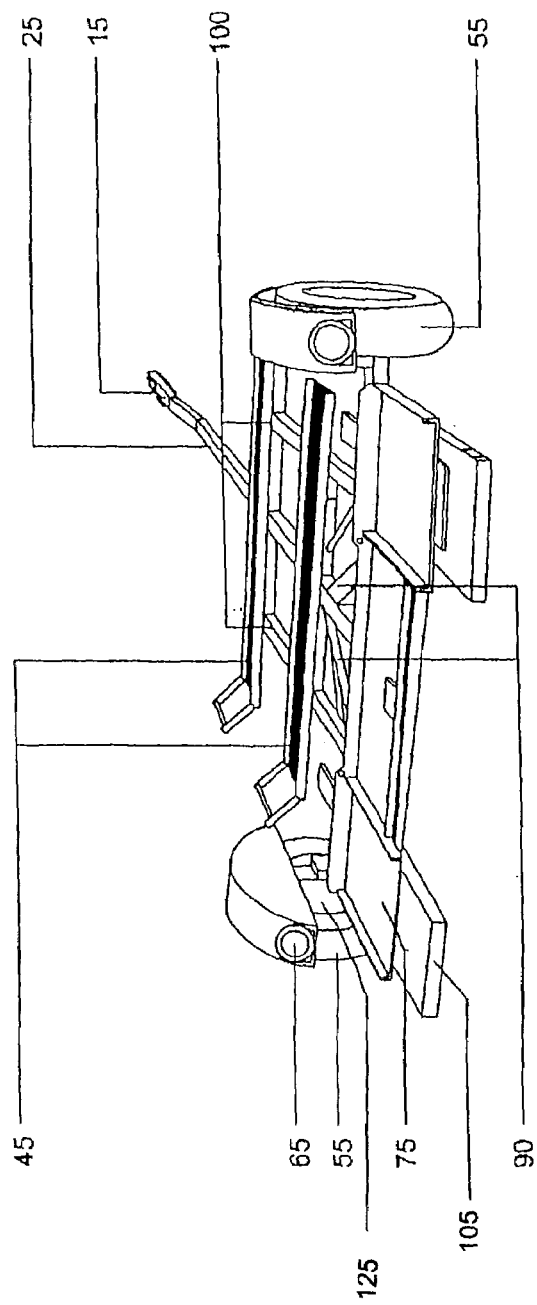
FIG. 10 shows a top perspective front view of the main components of the device.

As shown in FIG. 1, FIG. 2 and FIG. 10, the device has a towing base 100 which is comprised of a main support beam 25 which runs parallel to the motor home 400. The main support beam 25 is attached to a wheel axis support 95. The wheel axis support 95 is perpendicular to the main support beam 25 and attached through an attachment means such as welding. The towing base 100 has a plurality of angled supplemental support beams 90 that are attached to the towing base 100 and the wheel axis support 95 at a 45 degree angle. The angled supplement support beams 90 add additional support to the towing base 100.

The towing base 100 has a rack support base 35. The rack support base 35 is rectangular in shape. The rack support base 35 is attached to the support beam 25 and extending out an equal distance from the support base 25, two feet in the preferred embodiment parallel with the wheel axis support 95 and perpendicular to the main support beam 25. The rack support base 35 then turns at a 90 degree angle towards and connects to the wheel axis support 95. The rack support base 35 is symmetrical to the support beam 25 for maintaining a stable load balance. The rack support base 35 provides the support structure for the movable racks 45.

Figure 3:
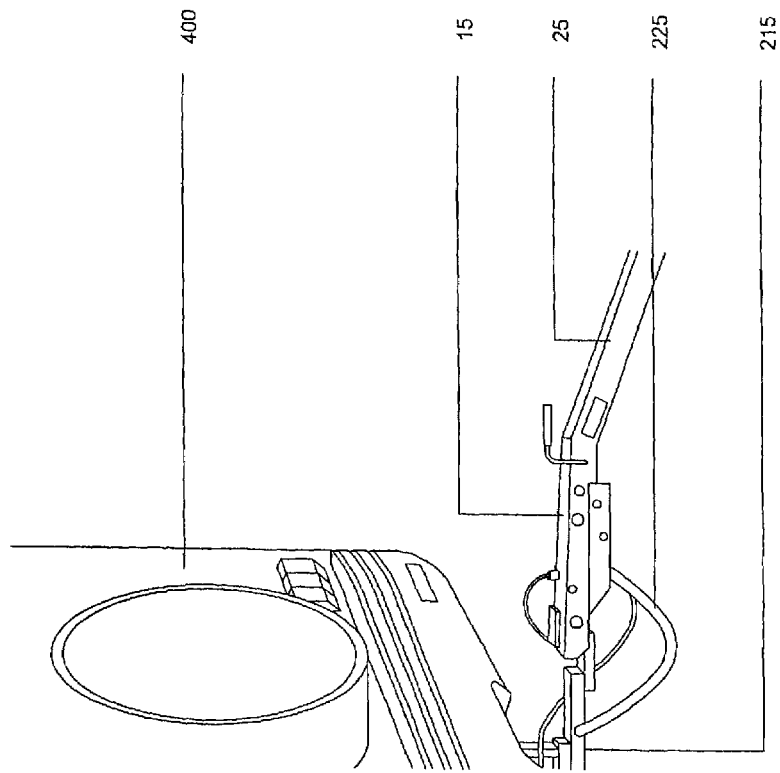
FIG. 3 shows a view of the hitch tongue of the device.

As shown in FIG. 3, connected to the support beam 25 and the opposite end of the wheel axis support 95 is the tongue hitch attachment 15. The tongue hitch attachment 15 is used to attach the device 1 to the hitch of the motor home 400 or other vehicle that is towing it. Tongue hitch attachments 15 are well known in the art and are not disclosed here in great detail. The tongue hitch attachment 15 has a socket that locks on the ball of the hitch 215. This allows the device 1 to turn separately from the motor home 400. The tongue hitch attachment 15 has a tongue weight which can be adjusted to comply with the motor home hitch's 215 requirements. The tongue weight of the device 1 must be in compliance with the Rated Hitch Capacity of the Tow Vehicle. The tongue weight is adjusted by moving the Swivel Plate location with the series of adjustment holes provided, which shifts weight towards or away from the tongue of the device 1. When making this adjustment, the pivot bolt and nut must be tightened to a point of having at least 3 threads of the end of the bolt exposed past the nut. The nut is a self locking style, and should always be stiffly rotating, if not, it must be replaced before using the device 1.

The wheel axis support 95 is connected to a plurality of wheels 55. There are two wheels 55 in the preferred embodiment, one on each side of the wheel axis support 95 and parallel to the support beam 25. The wheels 55 are attached to the wheel axis support 95 using a typical axle/ball bearing configuration. The wheels 55 add the mobility for the device 1. In the preferred embodiment, each wheel 55 and is attached to the wheel axis support 95. The fender 65 would be full fenders with inner liners. In the preferred embodiment the wheels 55 have tires that are 205/75R 14" Radial 6Ply Rated Trailer Tires-1760 lb Load Rating each.

The device 1 can be supplied with a braking system 125 of the wheels 55. This braking system can be with hydraulic surge brakes or electric brakes 125. A brake cable 225 runs from the motor home 400 to the device 1 to activate the brakes 125. The device 1 can also have turn signals and/or reflector lights.

Figure 4:
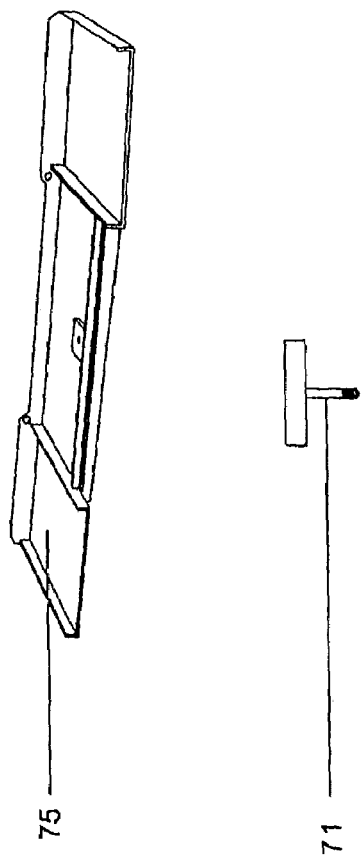
FIG. 4 displays the vehicle locator swivel plate.

The invention features an adjustable car locator swivel plate 75. This allows the adjustment of the weight distribution to "fine tune" the load. The adjustable car locator swivel plate 75 is slightly behind the wheels 55 in the direction opposite from the tongue hitch attachment 15. The car locator swivel plate 75 is on a pivot that allows for the adjustment of weight distribution. The locator swivel plate allows for multiple position car locator for correct balance. The location of the locator swivel plate 75 on the device 1, right behind the wheels 55 allows for the base distribution and the most efficient bearing of the load of the car weight. The vehicle locator plate 75 is used to locate, support and restrain the front wheels 355 of the towed vehicle 200. As shown in FIG. 4, the vehicle locator plate 75 is retained on the device by one large (pivot) bolt 71 in the center of the width and length of the plate 75. This bolt 71 is the point of rotation for the car 200 in tow as the dolly follows the motor home 400 through the radius of a turn. In the current invention, the locator plate 75 can be re-positioned through a series of hole positions 72 in a fore & aft member that is connected-to the base 100 that allow it to be either closer or further from the device 1 axle position. The device's 1 axle acts as the balance point for the golf cart 300 towards the front of the device 1, and the towed vehicle 200 towards the rear. By moving the locator plate 75 which moves the towed vehicle closer to the device 1 axle, (forward) or away from the axle (rearward), weight distribution can be directed towards the hitch or away from the hitch, allowing the operator to adjust their load distribution between the hitch 215 and the wheels 55.

Figure 5:
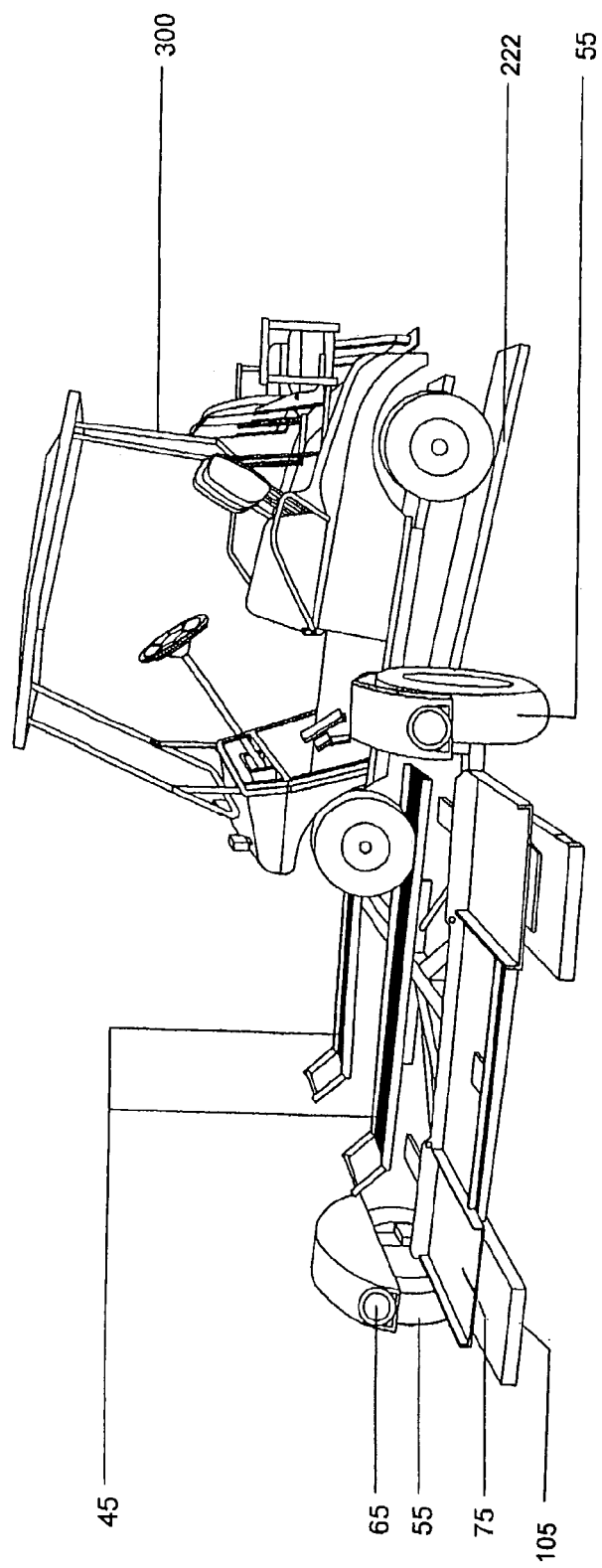
FIG. 5 displays a golf cart being loaded on the movable racks.

As shown in FIG. 5, the loading ramps 222 are used to load the automobile 200 and the golf cart 300 for transport in a quick and easy manner.

Figure 6:
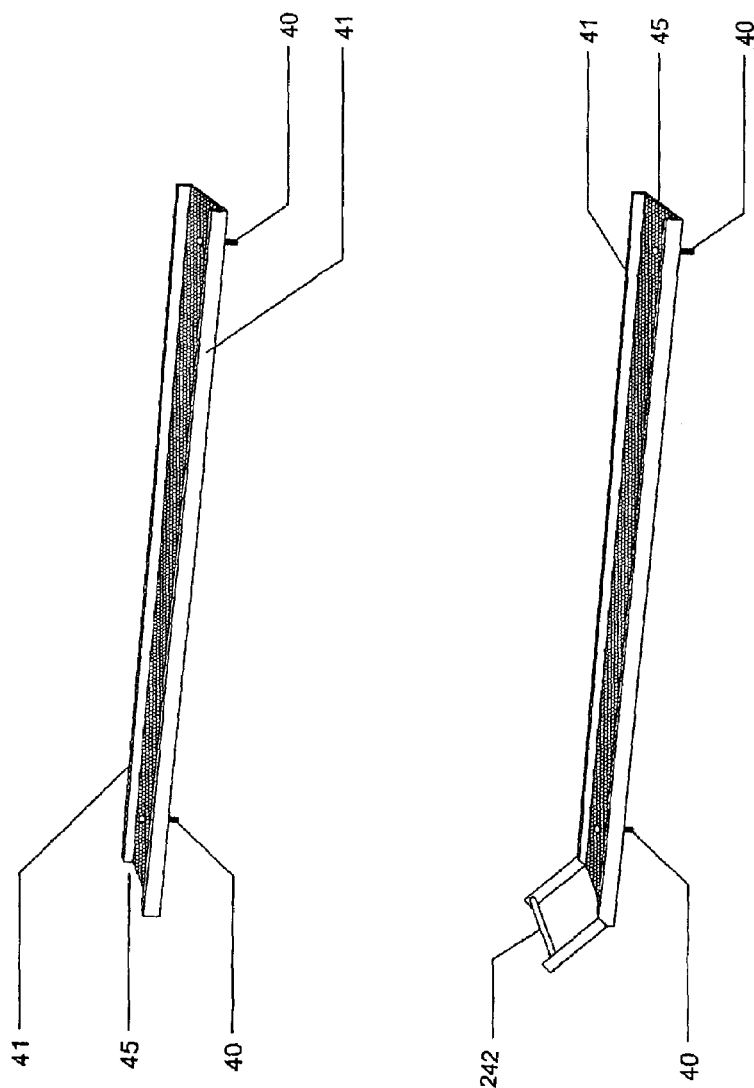
FIG. 6 displays the movable racks.

FIG. 6 shows the movable racks 45. The movable racks 45 are in a long rectangular shape wide enough for a standard golf cart tire to fit and approximately 102" in length in the preferred embodiment. The movable rack 45 has a lip 41 of two inches on each of its elongated sides. The short ends of the movable rack 45 are open to allow the loading and unloading of the golf cart 300 or other vehicle. Having both ends allow the golf cart 300 or other secondary vehicle can load from either side of the device 1. This is advantageous in busy and crowded parks.

In an alternative embodiment, the movable racks 45 can have a wheel chock 242 on one of the short sides which is used to secure the golf cart 300 or other vehicle and to make sure that the golf cart 300 does not go past the end of the movable racks 45.

Figure 7:
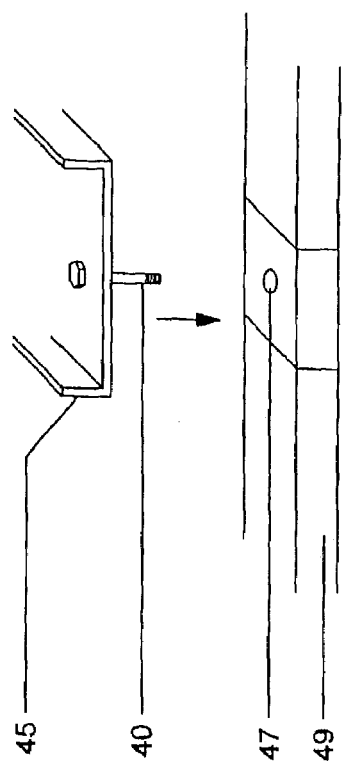
FIG. 7 displays the bolting rack attachment means.

The movable racks 45 are connected to the rack support base 35 through a connecting means as shown in FIG. 7. In the preferred embodiment, the connecting means is the use of pairs of attachment walls 42 that extend from the bottom of the movable racks 45. Each pair of attachment walls 42 are spaced apart with enough distance between them that they line up on either side of the beam 49 of the rack support base 35. In the preferred embodiment there are two beams 49 that form the rack support base 35. The attachment walls 42 are perpendicular to the elongated sides of the movable racks 45. The attachment walls 42 have a plurality of holes 46 that line up with a series of holes 47 in the beams 49 of the rack support base 35. An attachment means such as a bolt and lock pin 48 are used to secure the movable racks 45 to the rack support base 35.

Figure 8:
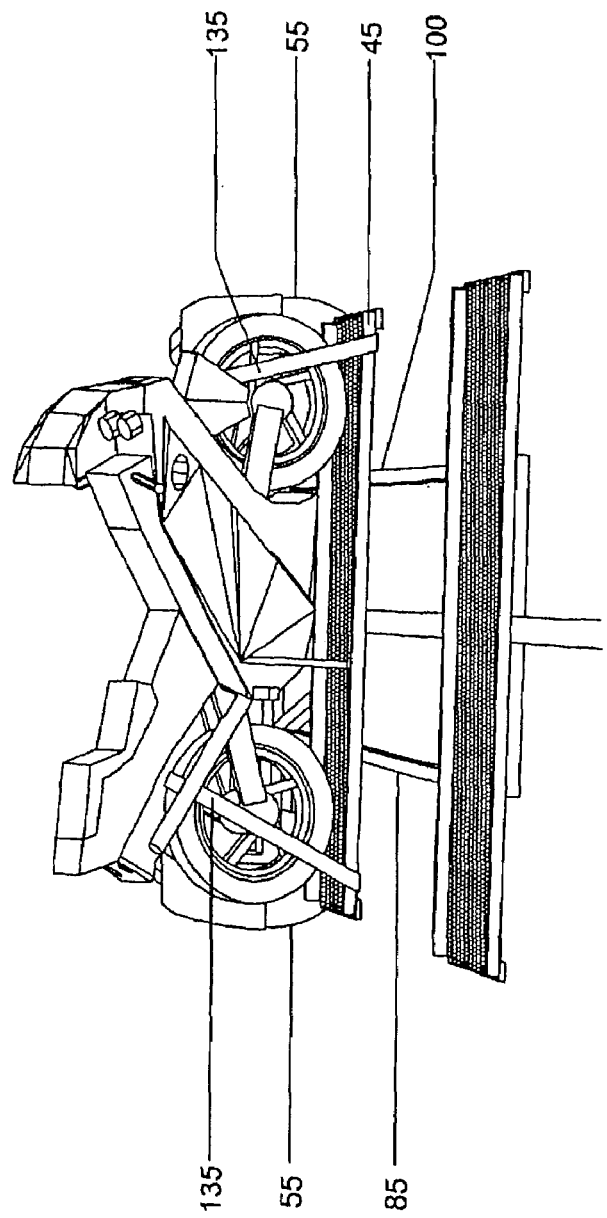
FIG. 8 displays the use of a movable rack with a motorcycle.

The movable racks 45 can be attached to the proper beam holes 47 that are best for the load to be loaded. This allows for adjustment of the movable racks 45 to best fit to load. For a standard golf cart 300, two movable racks 45 will be used, but only one or more then two movable racks 45 can be used depending on the load. FIG. 8 demonstrates the use of only one movable rack 45 for use with a motorcycle 500. The device 1 can be used with a motorcycle, ATV, Jet Ski or other similar device.

Because motor home site space is so limited, the device in the preferred embodiment fits within an area just 30" longer than a standard tow dolly. This will allow a user to tuck the device 1 up under the rear of a standard motor home 400 to save space.

An Attachment means, such as tie down straps 135 are used to secure the vehicle 200 and golf cart 300 to the device 1.

In the preferred embodiment the device 1 would have a 3500 lb Load Rating and a High Gloss Polyester Powder Coated Finish. In the preferred embodiment, the device 1 is made of a strong, durable but light weight material such as stainless strength steel with the parts molded and welded together using standard welding practices.

Having described the fundamental components and functions of an embodiment, details of the same are now described with greater specificity.

Operation

Figure 9:
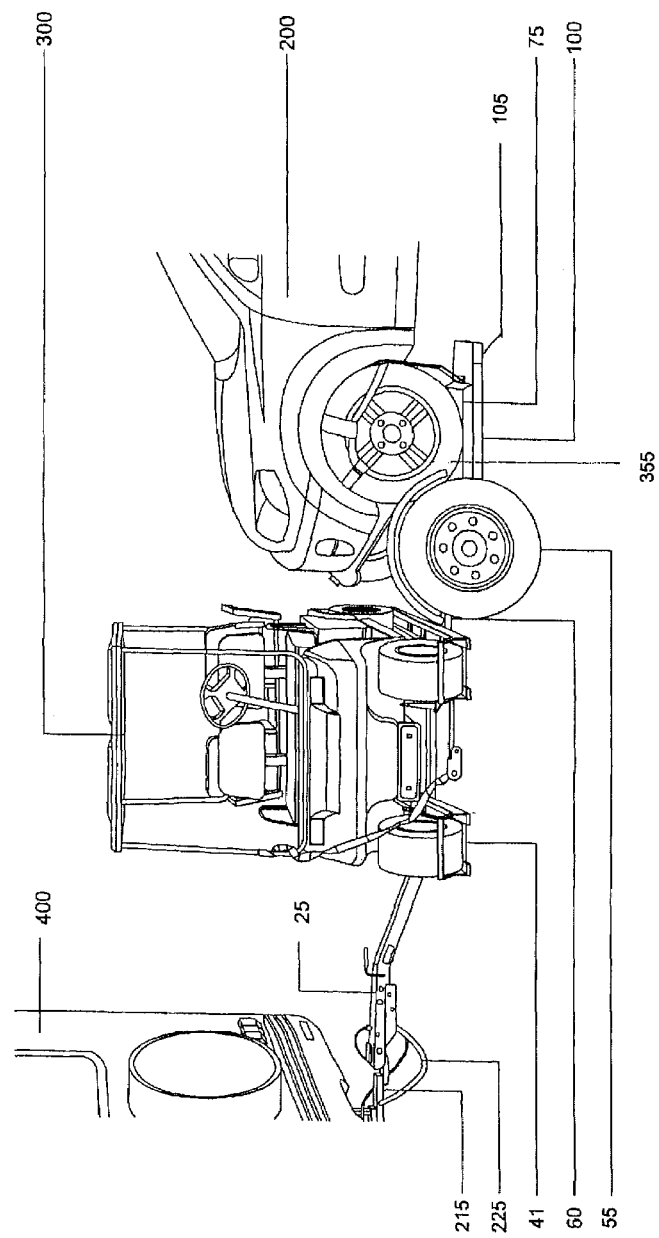
FIG. 9 shows the device towing a car and a golf cart.

FIG. 9 shows the device 1 load with a vehicle 200 and a golf cart 300 being towed by a motor home 400. It shows the fastening means, such as the tie down straps 135 for fastening the towed vehicles to the device 1. The device 1 must be securely hitched to the motor home 400 before loading. While FIG. 10 shows a prospective front view of the device 1 with the alternative embodiment of having the movable racks 45 having wheel chocks 42. Since the golf cart 300 or other secondary vehicle is transported crossways, it must measure less than 102 inches in length in order to comply with maximum width limits for highway use. The removal of rear facing seats, foot rests, or other accessories may be necessary.

Although many features, functions, and advantages of the present invention have been described in this specification, together with details of the structure of specific embodiments thereof, the description as a whole is illustrative only, and substitutions may be made in detail, especially in matters of shape, dimension and arrangement of elements within the principles of the invention to the full extent indicated by the broad, general meaning of the terms in which the claims are expressed.

Advantages

The previously described version of the present invention has many advantages, including many elements missing in all prior art.

Although many features, functions, and advantages of the present invention have been described in this specification, together with details of the structure of specific embodiments thereof, the description as a whole is illustrative only, and substitutions may be made in detail, especially in matters of shape, dimension and arrangement of elements within the principles of the invention to the full extent indicated by the broad, general meaning of the terms in which the claims are expressed. Therefore, the point and scope of the appended claims should not be limited to the description of the preferred versions contained herein.

That which is claimed is:

1. A device to tow at least two vehicles comprising:
   a base comprising a longitudinally extending main support beam and a support base attached to said main support beam,
   a pair of wheels on opposite sides of and connected to said support base having an axis of rotation at right angles to said main support beam, said axis of rotation being located between front and rear ends of said base,
   a hitch mounted on a forward end of said main support beam extending from the front end of said base for attachment to a towing vehicle,
   one or more racks on said support base between said axis of rotation and said hitch for supporting a first vehicle pointed at a right angle to direction of movement of said base;
   a movable vehicle locator swivel plate mounted on an upper side of and adjacent the rear end of said base to the rear of said axis of rotation for supporting two wheels of a second vehicle being towed,
   said movable locator swivel plate having a downwardly extending pivot bolt for pivoting around a vertical axis being a point of rotation for said vehicle being towed as said towing vehicle moves through a radius of a turn, and
   means for adjusting said movable locator swivel plate along a longitudinal axis of said base to adjust loads on said hitch comprising said downwardly extending pivot bolt from said swivel plate engaging a hole in a series of holes in said base arranged along said longitudinal axis of said base whereby said swivel plate is movable between said holes for adjusting a load on said hitch.

2. A towing device as in claim 1 where said first vehicle is a golf cart.

3. A towing device as in claim 1 where said first vehicle is a motorcycle.

4. A towing device as in claim 1 where said first vehicle is an ATV.

5. A towing device as in claim 1 where said first vehicle is a jet ski.

* * * * *